US011570009B1

(12) United States Patent
Mallipeddu et al.

(10) Patent No.: US 11,570,009 B1
(45) Date of Patent: Jan. 31, 2023

(54) SYSTEMS AND METHODS FOR ONBOARDING IOT DEVICES WITH SESSION CERTIFICATES

(71) Applicant: Amazon Technologies, Inc., Seattle, WA (US)

(72) Inventors: Ranganath Mallipeddu, Bellevue, WA (US); Yangfan Zhang, Kemore, WA (US); Nicholas A. Gochenaur, Seattle, WA (US); William Alex Stevenson, Seattle, WA (US); Lomash Kumar, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 475 days.

(21) Appl. No.: 16/693,066

(22) Filed: Nov. 22, 2019

(51) Int. Cl.
*H04L 9/32* (2006.01)
*H04L 67/141* (2022.01)
*H04L 67/12* (2022.01)
*H04L 67/60* (2022.01)

(52) U.S. Cl.
CPC .......... *H04L 9/3268* (2013.01); *H04L 9/3265* (2013.01); *H04L 67/12* (2013.01); *H04L 67/141* (2013.01); *H04L 67/60* (2022.05)

(58) Field of Classification Search
CPC ..... H04L 9/3268; H04L 9/3265; H04L 67/12; H04L 67/141; H04L 67/32
See application file for complete search history.

(56) References Cited

U.S. PATENT DOCUMENTS

| 7,797,532 | B2 | 9/2010 | Miura et al. |
| 8,838,973 | B1* | 9/2014 | Yung ................... H04L 63/1483 713/172 |
| 9,166,969 | B2 | 10/2015 | Hershberg et al. |
| 9,686,238 | B1* | 6/2017 | Row, II ................... H04L 12/06 |
| 9,977,415 | B2 | 5/2018 | Zimmerman et al. |
| 10,129,035 | B2 | 11/2018 | Gulati et al. |
| 10,148,630 | B2 | 12/2018 | Baghdasaryan |
| 2007/0083750 | A1* | 4/2007 | Miura ................... G06F 21/445 713/155 |
| 2008/0219444 | A1* | 9/2008 | Benteo ................ H04L 63/0823 380/282 |

(Continued)

*Primary Examiner* — Michael A Keller
*Assistant Examiner* — Thao D Duong
(74) *Attorney, Agent, or Firm* — Robert C. Kowert; Kowert, Hood, Hood, Munyon, Rankin & Goetzel, P.C.

(57) ABSTRACT

A device management service to facilitate onboarding of a remote IoT device may receive, from a client service, a request for a session certificate for a remote device. The device management service may send the session certificate to the client service, where the session certificate is valid for the remote device to obtain a primary certificate during a session duration. The device management service may receive, from the remote device, a request for the primary certificate for the remote device. The device management service may send, to the remote device, the primary certificate, wherein the primary certificate enables communication between the remote device and the device management service, and wherein the primary certificate has a primary duration that is longer than the session duration. The device management service may establish a communication channel with the remote device according to the primary certificate.

20 Claims, 7 Drawing Sheets

(56) References Cited

U.S. PATENT DOCUMENTS

| | | | | |
|---|---|---|---|---|
| 2014/0165147 A1* | 6/2014 | Hershberg | ............ | H04L 63/083 |
| | | | | 726/4 |
| 2016/0006729 A1* | 1/2016 | Yang | ................. | H04W 12/0433 |
| | | | | 713/156 |
| 2017/0005820 A1* | 1/2017 | Zimmerman | ........... | H04L 67/16 |
| 2017/0250812 A1* | 8/2017 | Schefenacker | ......... | H04L 9/321 |
| 2018/0351947 A1* | 12/2018 | Cheng | ................. | H04L 63/0869 |
| 2019/0260599 A1* | 8/2019 | Williams | .............. | H04L 9/3268 |

\* cited by examiner

US 11,570,009 B1

SYSTEMS AND METHODS FOR ONBOARDING IOT DEVICES WITH SESSION CERTIFICATES

BACKGROUND

Connected devices, such as Internet of Things ("IoT") devices, perform various tasks around a physical location in conjunction with one or more services operating via the Internet. IoT devices are manufactured with unique identifiers and unique certificates to enable communications with their respective services. Manufacturing the IoT devices with the unique certificates may increase production time and costs. Onboarding multiple IoT devices may be managed by a centralized device management service that is configured to manage certificates for the IoT devices. The unique certificates may be compared against certificates stored at the device management service to validate that the IoT devices are allowed to access the device management service. At scale, storage of numerous unique certificates creates a burden on the device management service.

The unique certificates embedded on the IoT devices may be valid for an indefinite time period because the manufacturer has no indication on how much time will pass between manufacturing and activation of the IoT device by an end user. Indefinite access to the device management service may create a security flaw that is avoidable by limiting access to the device management service by the IoT devices. The unique certificates embedded on the IoT devices are also not easily changed in response to changes to the device management service. For example, already manufactured IoT devices may need to be recalled from marketplaces in order to modify the embedded certificates.

Figure 1:
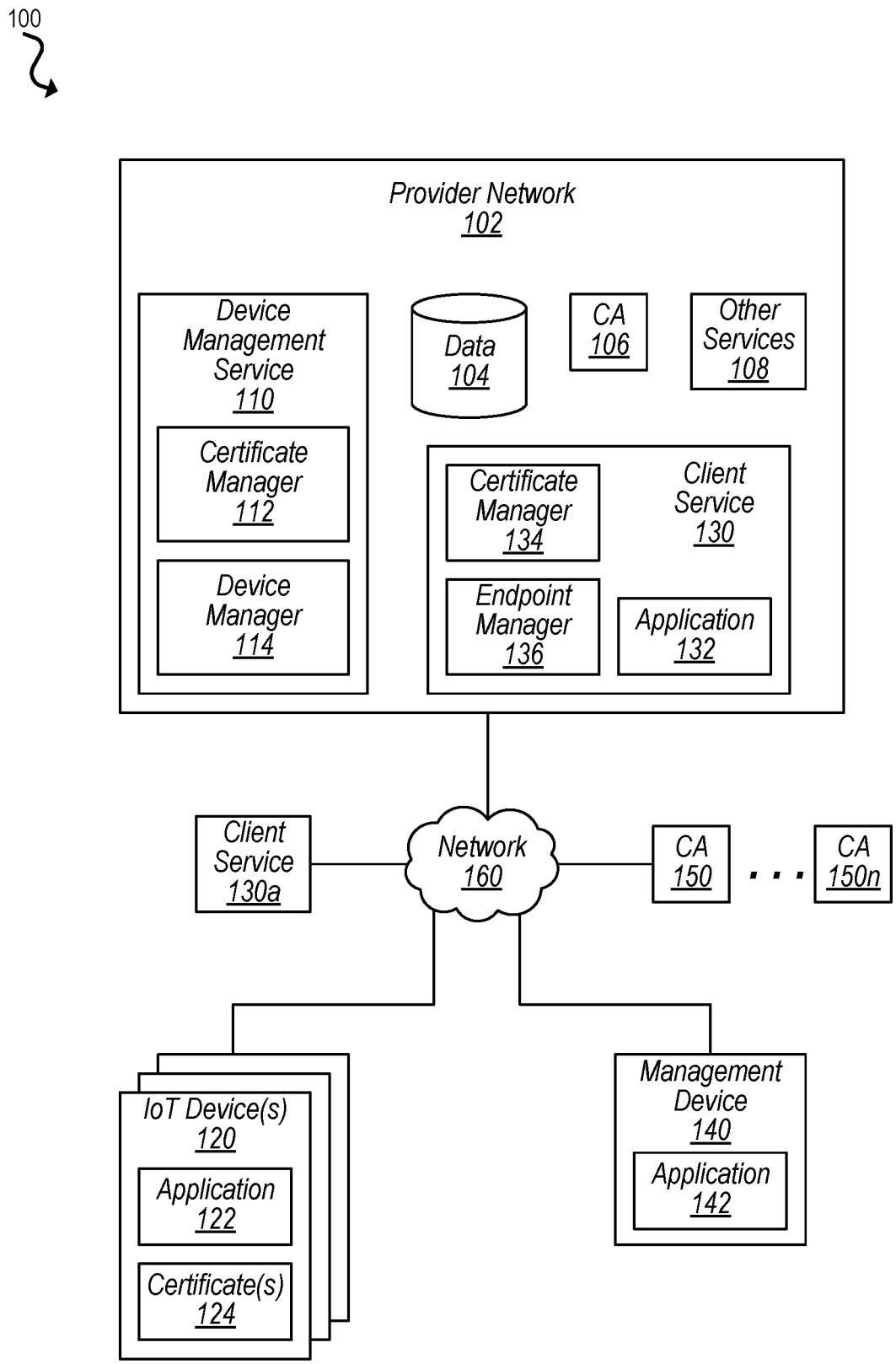
FIG. 1 is a block diagram illustrating a system having a device management service configured to facilitate onboarding an Internet of Things (IoT) device with a client service, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, paragraph (f), for that unit/circuit/component. Additionally, "configured to" can include generic structure (e.g., generic circuitry) that is manipulated by software or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On" or "Dependent On." As used herein, these terms are used to describe one or more factors that affect a determination. These terms do not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Various embodiments of systems and processes for onboarding Internet of Things (IoT) devices to an IoT service using a device management service is disclosed.

In one aspect of the invention, a device management service is disclosed. The device management service may be implemented as a system having one or more computing devices configured to implement the device management service. The device management service is configured to receive, from a client service, a request for a session certificate for a remote device. The device management service is also configured to send the session certificate to the client service, wherein the client service is configured to send the session certificate to the remote device, and wherein the session certificate is valid for the remote device to obtain a primary certificate during a session duration. The device management service is further configured to receive, from the remote device, a request for the primary certificate for the remote device, wherein the request for the primary certificate is generated based on the session certificate. The device management service is also configured to send, to the remote device, the primary certificate, wherein the primary certificate enables communication between the remote device and the device management service, and wherein the primary certificate has a primary duration that is longer than the session duration. The device management service is further configured to establish a communication channel with the remote device in response to a connection request from the remote device generated based on the primary certificate.

In another aspect of the invention, an IoT service is disclosed. The IoT service may be referred to as a client service based on a service-client relationship with the device management service. A method includes sending, from a client service to a device management service, a request for a session certificate for a remote device. The method also includes receiving, from the device management service, the session certificate, wherein the session certificate is valid for a session duration. The method further includes provisioning the remote device with the session certificate during the session duration for the remote device to request a primary certificate from the device management service, wherein the primary certificate has a primary duration that is longer than the session duration. The method also includes establishing a communication channel with the remote device according to the primary certificate.

In yet another aspect of the invention, an IoT device is disclosed. The IoT devices includes a network interface, one or more processors, and one or more memories. The one or more memories store instructions that, when executed on or across the one or more processors, cause the one or more processors to perform operations. The operations include responsive to receiving a session certificate from a client service via the network interface, configuring one or more device settings to enable communication with a device management service during a session duration according to the session certificate. The operations also include sending, to the device management service via the network interface, a request for a primary certificate, wherein the request includes the session certificate. The operations further include responsive to receiving the primary certificate from the device management service via the network interface, establishing a communication channel with the device management service via the network interface according to the primary certificate.

FIG. 1 is a block diagram illustrating a system 100 having a device management service 110 configured to facilitate onboarding an Internet of Things (IoT) device 120 with the device management service 110 with a client service 130 acting as an intermediary, according to some embodiments. The device management service 110 may facilitate onboarding of a plurality of IoT devices 120 as described herein. The IoT devices may be referred to as remote devices based on their relative location being remote from the device management service and/or the provider network. In some embodiments, the device management service 110 may be implemented by one or more computing devices which may be included as part of a provider network 102 configured to provide distributed computing resources. In some embodiments, the provider network 102 may include a data store 104, one or more certificate authorities (CAs) 106 and one or more other services 108 implemented on or across one or more computing devices under control of the provider network 102 and/or network administrators of the provider network 102. In some embodiments, various components of the system 100 may be communicatively coupled via a network 160.

The device management service 110 may include a certificate manager 112, according to some embodiments. The certificate manager 112 may be configured to manage certificates usable by one or more of the IoT device 120 and the device management service 110, according to some embodiments. For example, the certificate manager 112 may be configured to issue, revoke, enable, disable or modify certificates managed by the device management service 110.

The device management service 110 may include a device manager 114, according to some embodiments. The device manager 114 may be configured to manage devices that interact with various services that utilize the device management service 110. For example, the device manager 114 may manage the IoT device 120 that is associated with the client service 130. In some embodiments, management of the devices may include registering the devices with the device management service 110. For example, the device manager 114 may store information indicating a unique identifier for the IoT device 120, e.g., a unique device identifier (UDID) number, a MAC address, or any other suitable identifier. As another example, the device manager 114 may store information indicating a requesting entity, e.g., a user, which requested that the IoT device 120 be usable with the device management service 110. In some embodiments, the device manager 114 may store the information as registration information at the data store 104. For example, the device manager 114 may transmit the registration information to the data store 104 for storage in a database associated with the device management service 110. In some embodiments, the database may be segregated based on which service cased information to be added to the database. For example, the database may have different partitions dedicated to the device management service 110 relative to one or more of the other services 108. As another example, the database may be further segregated between various users of the device management service 110.

The client service 130 may be implemented by one or more computing devices included as part of the provider network 102, according to some embodiments. In other embodiments, a client service 130a may be implemented outside of the provider network 102 such that the client service 130a may communicate with the device management service 110 via a public network or a private network coupled to the provider network 102. Any descriptions contained herein of features of the client service 130 may apply similarly to the client service 130a.

The client service 130 may include an application 132 implemented by one or more resources of the client service 130, according to some embodiments. The application 132 may be accessible to users of the client service 130 or connected devices associated with the client service 130. For example, a user of the client service 130 may use a management device 140 to access the application 132. As another example, the management device 140 may include a web browser configured to access the application 132 via the network 160. In some embodiments, the management device 142 may include an application 142 that provides access to one or more functions of the client service 130. For example, the application 142 executing on the user device 142 may be configured to provide access to the application 132 implemented by the client service 130.

In some embodiments, the management device 140 may comprise one or more computer components to perform various computing operations. For example, the management device 140 may comprise a mobile device comprising one or more processors, a memory storing instructions, one or more network interfaces, and other components. As another example, the management device 140 may comprise a desktop computer or a notebook computer comprising one or more processors, a memory storing instructions, one or more network interfaces, and other components. In some embodiments, the management device 140 may comprise one or more storage devices configured to store program instructions that, when executed by the one or more processors, cause the one or more processors to perform various operations. For example, the management device 140 may store program instructions for an application 142 that may be configured to interface with the client service 130, e.g., interfacing with the application 132 implemented by the client service 130.

The management device 140 may include one or more network interfaces configured to detect other devices, according to some embodiments. For example, the management device 140 may comprise a Bluetooth interface configured to scan a local area around the management device 140 to detect the IoT device 130 being physically near the management device 140. As another example, the management device 140 may include a wireless networking adapter (e.g., an 802.11x-compatible chipset) configured to scan a local area network to detect the IoT device 130 connected to the local area network but not necessarily in a close proximate area to the management device 140. In some embodiments, the application 142 may be configured to initiate detection of the IoT device 120 in response to receiving a request to detect devices. For example, the application 142 may include one or more user interface (UI) elements that receive inputs that indicate a request to detect devices.

In response to the request to detect devices, the management device 140 may initiate a detection process to detect the IoT device 120. In some embodiments, the application 142 may receive indications of detected devices from the one or more network interfaces and generate a list of detected devices. For example, the application 142 may poll the one or more network interfaces to receive indications of detected devices, and after a period of time, generate the list of detected devices based on the received indications of detected devices. In some embodiments, the application 142 may be configured to determine whether a particular detected device is associated with the client service 130. For example, the application 142 may determine whether a detected device is intended to operate in conjunction with the client service 130 or if the detected device is unrelated to the client service 130. Based on the determination that the detected device is intended to operate in conjunction with the client service 130, the application 142 may present an indication of the detected device via a display device.

The management device 140 may initiate an onboarding process to initiate connection of the IoT device 120 with the client service 130, according to some embodiments. In some embodiments, the onboarding process may be initiated in response to inputs indicating a request to onboard the IoT device 120. For example, the application 142 may receive the inputs indicating the request to onboard the IoT device 120 and initiate the onboarding process responsive to the request. In some embodiments, the IoT device 120 may be configured to broadcast a signal that is detectable by the management device 140. For example, upon an initial startup, the IoT device 120 may broadcast a beacon signal that indicates that the IoT device 120 is ready to be paired to a management device, such as the management device 140, to initiate a connection to the client service 130.

In some embodiments, the IoT device 120 may not already have a certificate allowing the IoT device 120 to interface with the device management service 110 to perform functions provided by the device management service 110. For example, the IoT device 120 may be produced or manufactured without a certificate as a cost-saving or production-increasing measure such that the IoT device 120 may acquire a certificate at a later time.

The management device 140 may send an indication of the IoT device 120 to the client service 130, according to some embodiments. For example, the application 142 may transmit information regarding the IoT device 120 to the application 132 executing as part of the client service 130. In some embodiments, the client service 130 may send a request for a session certificate for the IoT device 120 to the device management service 110. The session certificate may be used by the IoT device 120 to facilitate the onboarding process from the IoT device 120. In some embodiments, the client service 130 may establish a secure connection to the device management service 110 to send the request for the session certificate. For example, the client service 130 may establish the secure connection to the device management service 110 according to a secure communication protocol, such as a transport layer security (TLS) protocol, to transmit the request for the session certificate. In some embodiments, the request for the session certificate may indicate one or more of the IoT device 120, the user of the IoT device 120, the client service 130, or any other identifying information. In some situations, the session certificate may be usable by the IoT device 120 for one session, such as a connection to the device management service 110 to obtain a primary certificate. The session certificate may alternatively be referred to as a birth certificate based on its usage to facilitate the onboarding process of the IoT device 120.

The device management service 110 may receive the request for the session certificate from the client service 130 and generate the session certificate in response to the request, according to some embodiments. In some embodiments, the session certificate may include data that the device management service 110 may require for validation or authentication at a later time. For example, the session certificate may include policy associations and metadata for the device management service. In some embodiments, the certificate manager 112 of the device management service 110 may be configured to generate the session certificate responsive to the request for the session certificate from the client service 130. For example, the certificate manager 112 may initiate generation of the session certificate at the certificate manager 112. As another example, the certificate manager 112 may request that a CA 106 generate the session certificate on behalf of the device management service 110. In yet another example, the certificate manager 112 may generate the session certificate and request that the CA digitally sign the session certificate. In some embodiments, the session certificate may be encrypted to prevent a malicious actor from intercepting and using the session certificate for an unauthorized device. For example, the CA may be configured to encrypt the session certificate after generation of the session certificate. As another example, the certificate manager 112 may be configured to encrypt the session certificate after generation of the session certificate. In some embodiments, the device management service 110 may request that a CA 150 outside of the provider network 102 generate, encrypt and/or sign the session certificate on behalf of the device management service 110. For example, the device management service 110 may trust the CA 150 to contribute to the generation of the session certificate such that the CA 150 is able to generate the session certificate for the device management service 110. In some embodiments, the certificate manager 112 may include a cache of session certificates that may be distributed to IoT devices 120 on request. For example, the certificate manager 112 may store unassigned session certificates such that a session certificate may be sent to an IoT device 120 on-demand without requiring additional generation of session certificates.

The session certificate may be used by a device, such as the IoT device 120, in order to initiate the onboarding process. After initiating the onboarding process, the session certificate may be discarded and/or not permitted to be used at a later point in time or by another device. In some embodiments, the session certificate may be configured to be valid for a limited period of time. For example, the session certificate may be encoded to expire at a particular point in time. As another example, the session certificate may include an indication of a period of time in which the session certificate is valid. In some embodiments, the session certificate may include information that indicates that the session certificate is valid only for a particular device. For example, the session certificate may indicate that the session certificate is valid only for the IoT device 120. As another example, the session certificate may indicate that the session certificate is valid for a particular plurality of devices, such as devices associated with a particular user of the device management service 110.

The session certificate may have a limited duration of time in which the session certificate is valid, according to some embodiments. For example, the session certificate may include an indication of an expiration time or a valid time period that is effectively limited in duration. As another example, the session certificate may have a session duration that indicates a duration of time allowable to complete an onboarding session with the device management service 110. As another non-limiting example, the session certificate may have a valid time period that allows sufficient time to onboard the IoT device 120 with the device management service 110. In yet another example, the session certificate may indicate that the session certificate is valid for one hour to allow adequate time for the IoT device 120 to be onboarded. In some embodiments, the valid time period or the expiration time may be determined based on statistical analysis of numerous onboarding times for numerous IoT devices for numerous client services. As a non-limiting example, the session certificate may be valid for several minutes to an hour in order to give adequate time for the IoT device 120 to request a primary certificate from the device management service 110. In another example, the session certificate may be valid for a day to allow a wider tolerance of time to onboard the IoT device 120 with the device management service 110. In some embodiments, the session certificate may be valid for a limited number of uses. For example, the session certificate may be valid for one use to allow the IoT device 120 to communicate with the device management service 110.

The device management service 110 may be configured to store information pertaining to the generation of the session certificate, according to some embodiments. For example, the device management service 110 may store information including an indication of the IoT device 120, an indication of the user of the IoT device 120, an indication of the client service 130, a description of methods used in generating the session certificate, or other identifying information. In some embodiments, the session certificate may not necessarily be stored by the device management service 110 into long-term storage because the session certificate may expire in a relatively short period of time. For example, the long-term storage may have a retention period that exceeds the limited period of time of the session certificate that may result in an expired session certificate to be stored and retained.

After generation of the session certificate, the device management service 110 may send the session certificate via the secure connection to the client service 130 according to the secure communication protocol according to some embodiments. For example, the device management service 110 may utilize the secure connection that was established for transmission of the request for the session certificate.

The client service 130 may receive the session certificate from the device management service 110. In some embodiments, the client service 130 may include a certificate manager 134 configured to manage session certificates for associated devices. For example, the certificate manager 134 may be configured to deploy, enable, disable, modify, revoke, or perform any other operation to certificates for devices used with the client service 130. In some embodiments, the certificate manager 134 may deploy the session certificate to the IoT device 120. For example, the certificate manager 134 may cause the client service 130 to send the session certificate to the IoT device 120 without storing or recording the session certificate to the client service 130. In some embodiments, the certificate manager 134 may interact with the management device 140 to cause the management device 140 to send the session certificate to the IoT device 120. For example, the certificate manager 134 may provide access to the session certificate to the application 142 of the management device 140. As another example, the certificate manager 134 may make the session certificate available via the application 132 of the client service 130.

The management device 140 may be configured to provision the IoT device 120 according to the session certificate, according to some embodiments. For example, the management device 140 may deploy the session certificate to the IoT device 120. In some embodiments, the client service 130 may be configured to provision the IoT device 120 according to the session certificate. For example, the client service 130 may cause deployment of the session certificate to the IoT device 120 without the management device 140.

The client service 130 may manage endpoint information for accessing one or more of the device management service 110 or the client service 130, according to some embodiments. For example, an endpoint manager 136 of the client service 130 may determine one or more endpoints for which the IoT device 120 may access the device management service 110. The client service 130 may provide the endpoint information to the IoT device 120 in conjunction with the session certificate to facilitate connections between the IoT device 120 and the device management service 110, according to some embodiments. For example, the client service 130 may indicate one or more endpoints to the device management service 110 as endpoint information and send the endpoint information to the IoT device 120. The IoT device 120 may attempt connections to the one or more endpoints indicated in the endpoint information in order to obtain a primary certificate from the device management service 110.

In some embodiments, the IoT device 120 may receive the session certificate and store the session certificate into a storage device in the IoT device. For example, the IoT device 120 may store the session certificate to a storage device that is configured to store one or more certificates 124. In other embodiments, the IoT device may modify one or more configuration settings based on the session certificate. For example, the IoT device may modify connection settings or security settings based on information indicated by the session certificate. In some embodiments, the session certificate may indicate permissions for functions that the IoT device 120 may be allowed to perform. For example, the session certificate may indicate that an application 122 of the IoT device 120 may be permitted to perform particular functions related to the device management service 110. As another example, the session certificate may include permissions indicating that the IoT device 120 may only access the device management service 110 in order to request a long-term certificate.

Prior to expiration of the session certificate, the IoT device 120 may request that the device management service 110 provide a primary certificate for the IoT device 120 for long-term use by the IoT device 120, according to some embodiments. For example, the IoT device 120 may send a request to the device management service 110 requesting the primary certificate to facilitate communications between the IoT device 120 and the device management service 110 for a longer duration of time than the valid time period of the session certificate. In some embodiments, the primary certificate may be a long-term certificate that has a duration of time in which the primary certificate is valid, where the duration of time is an order of magnitude larger than the valid time period of the session certificate. For example, the primary certificate may indicate a primary duration of time for which the IoT device 120 is allowed to maintain communications with the device management service 110. As a non-limiting example, the session certificate may have a session duration of 1 hour, while the primary certificate may have a primary duration of 30 days to 1 year. In other embodiments, the primary certificate may not have a defined expiration time in contrast with the expiration time of the session certificate being a relatively short period of time from generation of the session certificate.

The request for the primary certificate sent to the device management service 110 may include data based on the session certificate that may be used by the device management service 110 to validate the request and/or the IoT device 120, according to some embodiments. For example, the IoT device 120 may include the session certificate as part of the request for the primary certificate. As another example, the IoT device 120 may include portions of information from the session certificate (e.g., keys) as part of the request for the primary certificate. In some embodiments, the device management service 110 may validate the request for the primary certificate based on validating the session certificate. For example, the device management service 110 may use the certificate manager 112 to validate the session certificate included in the request for the primary certificate. As another example, the device management service 110 may use the certificate manager 112 to validate keys included in the request for the primary certificate.

After validating the session certificate, the device management service 110 may generate the primary certificate, according to some embodiments. In some embodiments, the certificate manager 112 of the device management service 110 may be configured to generate the primary certificate. For example, the certificate manager 112 may act as a CA to generate and/or sign the primary certificate on behalf of the device management service 110. In some embodiments, the certificate manager 112 may request that a CA 106 in the provider network 102 generate and/or sign the primary certificate. For example, the CA 106 may be configured to generate the primary certificate according to any suitable cryptographic standard. In some embodiments, the CA 106 may also be configured to sign and/or encrypt the primary certificate generated by the certificate manager 112. For example, the certificate manager 112 may generate the primary certificate and send the primary certificate to the CA such that the CA 106 may sign and/or encrypt the primary certificate on behalf of the device management service 110. In other embodiments, the certificate manager 112 may request that one or more CAs 150 . . . 150n outside of the provider network 102 generate, sign and/or encrypt the primary certificate on behalf of the device management service 110. For example, the certificate manager 112 may send a request to the CA 150 to generate the primary certificate. As another example, the certificate manager 112 may send a primary certificate, generated by the certificate manager 112, to the CA 150 via the network 160 to request that the CA 150 sign and/or encrypt the primary certificate on behalf of the device management service 110. In some embodiments, the certificate manager 112 may convert the session certificate to the primary certificate.

The certificate manager 112 may cause the primary certificate to be deployed or sent to the IoT device 120, according to some embodiments. For example, the certificate manager 112 may send the primary certificate to the IoT device 120. As another example, the certificate manager 112 may instruct the CA 106 that generated the primary certificate to send the primary certificate to the IoT device 120. In yet another example, the certificate manager 112 may instruct the CA 150 that generated the primary certificate to send the primary certificate to the IoT device 120.

After receiving the primary certificate, the IoT device 120 may provision or configure one or more configuration settings in accordance with the primary certificate, according to some embodiments. For example, the IoT device 120 may apply security settings based on the primary certificate. In some embodiments, the IoT device 120 may store the primary certificate to data storage on the IoT device 120. For example, the IoT device 120 may store the primary certificate as the one or more certificates 124 to facilitate retrieval of the primary certificate at a later time. Alternatively, storing multiple certificates may allow the IoT device 120 to access multiple services in addition to the client service 130 or the device management service 110.

The IoT device 120 may establish a connection with the device management service 110 after provisioning the IoT device 120 in accordance with the primary certificate, according to some embodiments. For example, the IoT device 120 may send a connection request to the device management service 110. In some embodiments, the connection request may include the primary certificate to allow the device management service 110 to validate the connection with the IoT device 120. In some embodiments, the IoT device 120 may connect to the device management service 130 via an endpoint that is different from the connection used to request the session certificate. For example, the device management service 110 may have one or more additional endpoints configured to establish connections to perform tasks related to IoT interactions. As another example, the device management service 110 may have a plurality of endpoints which each respectively correspond to respective functions of the device management service 110. After the connection is established, the IoT device 120 may interact with the device management service 110 based on performing one or more functions according to the application 122 of the IoT device.

Figure 2:
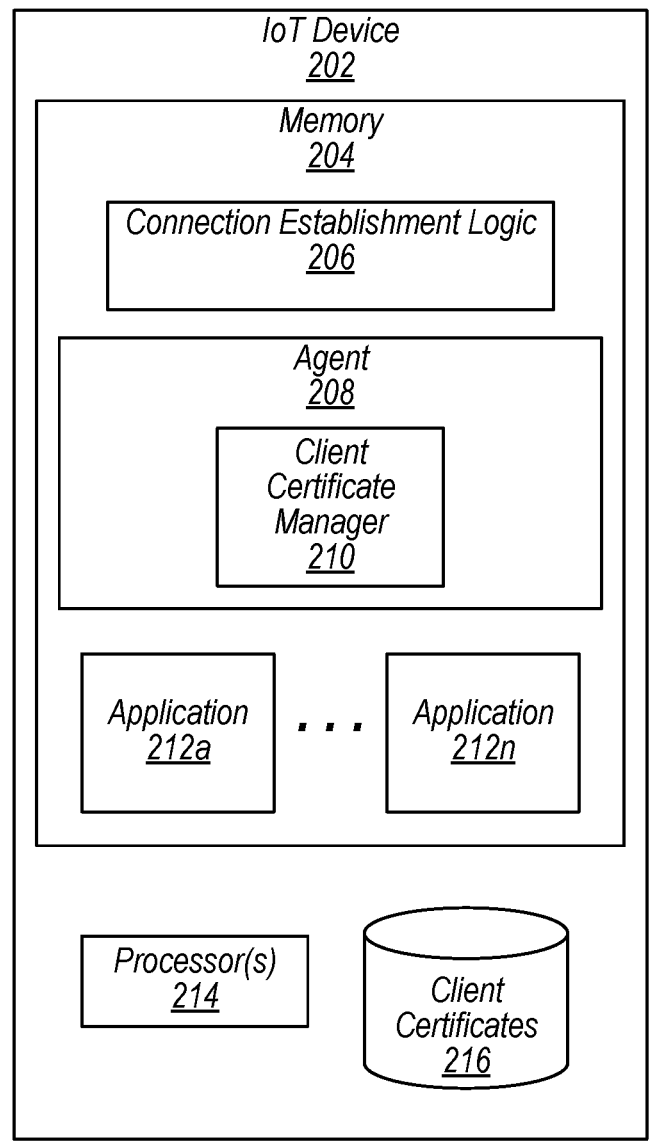
FIG. 2 is a block diagram illustrating an IoT device including an agent for a device management service, according to some embodiments.

FIG. 2 is a block diagram illustrating an IoT device including an agent for a device management service, according to some embodiments. As depicted, the device 202 (e.g., one of the devices 108) includes a memory 204 that includes connection establishment logic 204. In embodiments, the connection establishment logic may be any application logic and/or operating system logic that establishes, at least in part, one or more connections between the device (e.g., one or more applications running on the device) and a service (e.g., one or more services 104). For example, an internet browser application may include some or all of the connection establishment logic used to establish a connection from the device side.

The memory also includes an agent 208 that includes client certificate manager 210. In some embodiments, the client certificate manager 210 may enable/disable one or more client certificates on the device, remove one or more client certificates from the device, and/or request one or more new client certificates for the device. The agent 208 may be included as part of a trusted execute environment, according to some embodiments. For example, the trusted execute environment may include a dedicated memory and dedicated software configured to be separate from the memory 204 and applications 212a . . . 212n.

The memory also includes any number of applications 212a . . . 212n. The device may also include one or more processors 214 and any number of client certificates 216 that may be used by any number of the applications 212 to establish connections with services. In some embodiments, the client certificates 216 may be stored in a secure element. For example, the client certificates 216 may be stored in a component configured to be secured from unauthorized access from one or more components of the IoT device 202. In some embodiments, each application 212 may be assigned its own assigned client certificate 216 (e.g., stored in the operating memory 204 and/or on another data store of the device) to establish a connection with a service. In some embodiments, each of the applications may have a valid client certificate to establish connections with one or more respective services or each of the applications may have a disabled or non-existent client certificate on the device (depending on whether the certificate is expired or not yet obtained).

Figure 3:
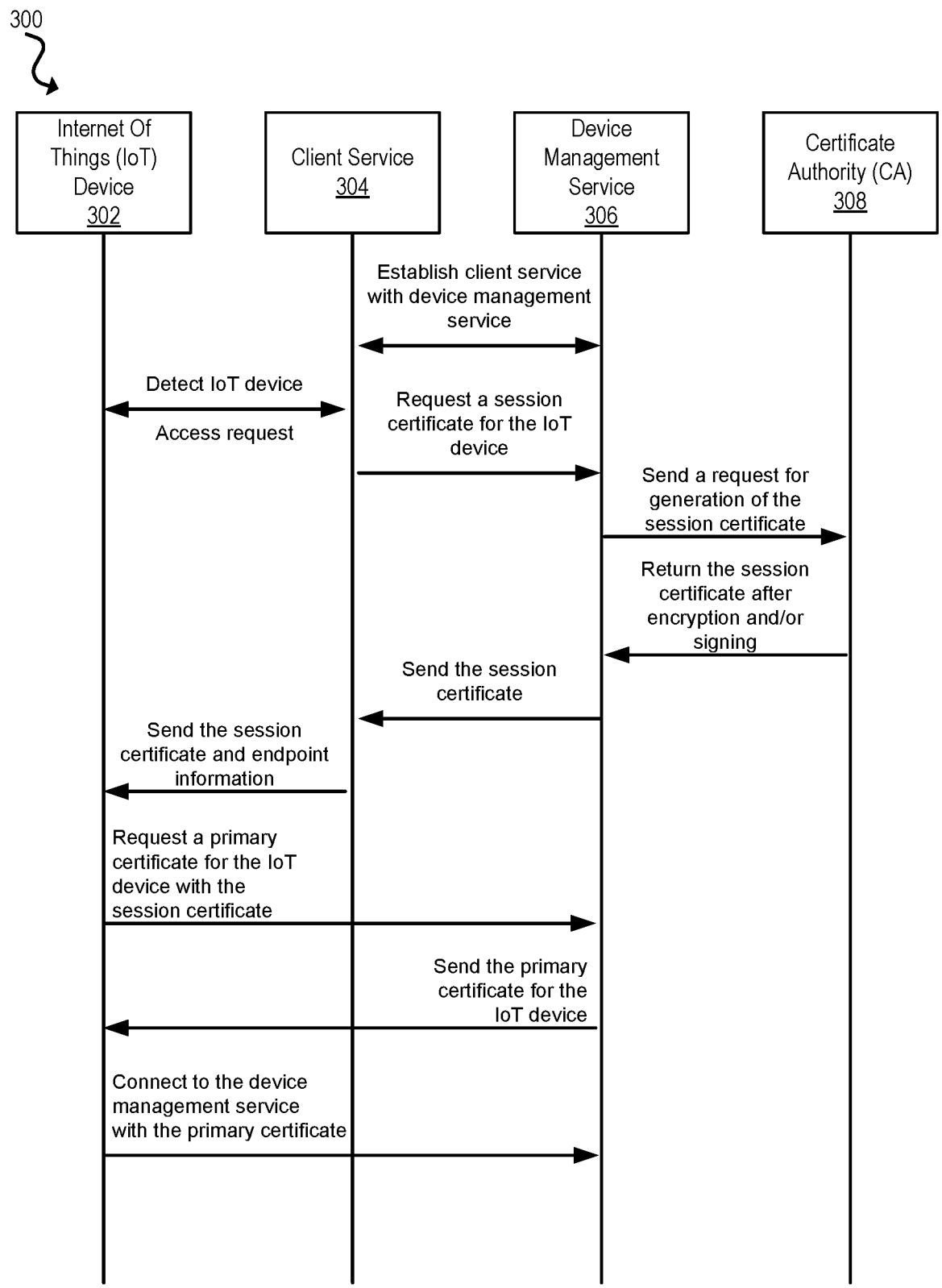
FIG. 3 is a timeline diagram illustrating interactions between an IoT device, a client service and a device management service, according to some embodiments.

FIG. 3 is a timeline diagram 300 illustrating interactions between an IoT device 302, a client service 304 and a device management service 306, according to some embodiments. The device management service 306 may be implemented at a provider network, in some embodiments. The client service 304 may be implemented as a client of the provider network. In some embodiments, the client service 304 may be implemented by one or more computing resources as part of the provider network. In other embodiments, the client service 304 may be connected to the provider network via one or more network connections, such as an open Internet connection or an intranet connection.

The client service 304 may send a request to the device management service 306 to establish the client service 304 with the device management service 306, according to some embodiments. For example, the client service 304 may send the request to the device management service 306 to register the client service 304 as a delegate or a user of one or more features of the device management service 306. The client service 304 may indicate to the device management service 306 that the device management service 306 may generate, provide, or manage certificates for devices that interface with the client service 304. The devices that interface with the client service 304 may include the IoT device 302 and other devices, in some embodiments. In other embodiments, the device management service 306 may send the request to the client service 304 to register the client service 304 with the device management service 306.

The client service 304 may attempt to connect to the IoT device 302 in response to activation or powering on of the IoT device 302, according to some embodiments. For example, the client service 304 may be configured to detect when the IoT device 302 is powered on and enabled prior to onboarding and registration of the IoT device 302 with the client service 304 and/or the device management service 306. In some embodiments, the client service 304 may utilize one or more applications configured to interface with the IoT device 302 and the device management service 306. For example, the client service 304 may utilize a mobile application executing on a mobile device, e.g., a smartphone device or a tablet device, to interact with the IoT device 302. As another example, the client service 304 may include a desktop application executing on a computer, e.g., a desktop computer or a notebook computer.

The IoT device 302 may be produced, constructed, fabricated, or manufactured without a certificate that is used to facilitate an onboarding process to connect the IoT device 302 to the device management service 306, according to some embodiments. In order for the IoT device 302 to connect to the device management service 306, the IoT device 302 may request a session certificate from the client service 304 in order to facilitate long-term communication, in some embodiments. For example, the IoT device 302 may be configured to search or scan a local connection, e.g., a local area network or a Bluetooth connection, to detect the one or more applications of the client service 304. As another example, the one or more applications of the client service 304 may search or scan the local connection to detect the IoT device 302.

The client service 304 may send a request for a session certificate to the device management service 306, according to some embodiments. For example, one or more applications of the client service 304 may generate the request and send the request to the device management service 306. In some embodiments, the request may include identifying information about the IoT device 302, such as a unique device identifier (UDID) number or a media access control (MAC) address for the IoT device 302. In some embodiments, the client service 304 may send the request for the session certificate via a secure communication protocol. For example, the client service 304 may send the request for the session certificate via a transport layer security (TLS) protocol.

The device management service 306 may receive the request for the session certificate from the client service 304 and generate the session certificate in response to the request, according to some embodiments. In some embodiments, the device management service 306 may generate the session certificate according to the identifying information for the IoT device 302 included in the request for the session certificate. For example, the device management service 306 may generate the session certificate based on the UDID and/or MAC address of the IoT device. In some embodiments, the device management service 306 may utilize a certificate authority (CA) configured to generate the session certificate according to the identifying information for the IoT device 302 included in the request for the session certificate. For example, the CA may generate the session certificate based on a digital signature applied to the UDID and/or MAC address of the IoT device. In another embodiment, the device management service 306 may generate the session certificate to be valid for a limited duration of time or a limited time period. For example, the device management service 306 may encode, into the session certificate, an activation and/or an expiration time to indicate the limited time period in which the session certificate is valid for the IoT device 302. In some embodiments, the CA may be another service of the provider network. In other embodiments, the CA may be a component of the device management service 306. In yet another embodiment, the CA may be a third-party service that is accessible via one or more application programming interfaces (APIs). In some embodiments, the session certificate may be usable across a plurality of IoT devices 120. For example, the session certificate may be usable by one user account on the device management service 110 that is associated with the plurality of IoT devices 120.

In some embodiments, the session certificate may indicate one or more functions that the IoT device 302 may perform. For example, the device management service 306 may generate the session certificate to include a list of the one or more functions that the IoT device 302 may perform. In some embodiments, the one or more functions indicated in the session certificate may correspond to a subset of functions that the IoT device 302 is capable of performing. For example, the IoT device 302 may be restricted from performing one or more other functions based on the session certificate not indicating that the IoT device 302 has permission to perform the one or more other functions. Alternatively, the IoT device 302 may be restricted from performing one or more other functions based on the session certificate specifically indicating that the IoT device 302 may not perform the one or more other functions.

The device management service 306 may be configured to encrypt the session certificate to prevent malicious actors from intercepting the session certificate and deploying the session certificate to an unauthorized device, according to some embodiments. In some embodiments, the device management service 306 may utilize the CA to digitally sign and/or encrypt the session certificate. For example, the CA may sign and/or encrypt the session certificate after generation of the session certificate.

In some embodiments, the device management service 306 may record data regarding the generation of the session certificate to a data store. For example, the device management service 306 may record information pertaining to how the session certificate was generated and what entity requested generation of the session certificate. In some situations, the device management service 306 may refrain from saving a copy of the session certificate due to the limited time period for which the session certificate is valid in order to reduce storage utilization for short-term certificates.

The device management service 306 may send the session certificate to the client service 304, according to some embodiments. For example, the device management service 306 may utilize the secure communication protocol to securely send the session certificate to the client service 304. In some embodiments, the device management service 306 may send information indicating one or more endpoints for the device management service 306 that are accessible by the IoT device 302. For example, the device management service 306 may send endpoint information to the client service 304 in order for the client service 304 to inform the IoT device 302 what endpoints are usable by the IoT device 302 to obtain a primary certificate. The primary certificate may be a certificate that has a longer duration of validity with respect to the session certificate. In some embodiments, the primary certificate may be a long-term certificate with a duration of validity that is an order of magnitude larger than a duration of validity of the session certificate.

The client service 304 may send the session certificate to the IoT device 302, according to some embodiments. For example, the client service 304 may transmit the session certificate to the IoT device 302 via a local connection, such as a local area network or a Bluetooth connection. The client service 304 may send the endpoint information to the IoT device 302, according to some embodiments. For example, the client service 304 may transmit the endpoint information to the IoT device 302 via a local connection, such as a local area network or a Bluetooth connection.

After the IoT device 302 receives the session certificate and the endpoint information from the client service 304, the IoT device 302 may attempt to establish a connection with the device management service 306, according to some embodiments. In some embodiments, the IoT device 302 may send a request for a primary certificate to the device management service 306 in accordance with the session certificate. For example, the IoT device 302 may generate the request for the primary certificate based on the session certificate and identifying information for the IoT device 302 including, but not limited to, a UDID number, a MAC address, user identification information, or any other type of information that identifies the IoT device 302 or a user of the client service 304. In some embodiments, the request for the primary certificate may include the session certificate to authenticate the request with the device management service 306. In other embodiments, the request for the primary certificate may include security information, such as keys from the session certificate, to authenticate the request with the device management service 306. In some embodiments, the IoT device 302 may establish a secure connection with the device management service 304 using the endpoint information and the session certificate. For example, the IoT device 302 may use an endpoint indicated in the endpoint information as a destination for communication via a secure communication protocol, e.g., a TLS protocol. As another example, the IoT device 302 may include the session certificate as part of the request for the primary certificate.

The device management service 306 may receive the request for the primary certificate from the IoT device 302, according to some embodiments. In response to the request for the primary certificate, the device management service 306 may validate the session certificate using a suitable method. For example, the device management service 306 may determine whether the session certificate is included in the request for the primary certificate and is valid. As another example, the device management service 306 may determine whether keys included in the request for the primary certificate match keys included in the session certificate that was generated by the device management service 306.

The device management service 306 may generate the primary certificate for the IoT device 302, according to some embodiments. For example, the device management service 306 may generate a certificate usable by the IoT device 302 to connect to the client service 304 that is effectively unlimited in duration. As another example, the device management service 306 may generate a certificate usable by the IoT device that does not include an indication of a limited time period for which the certificate is usable. In some embodiments, the device management service 306 may use a CA to generate and/or sign the primary certificate. For example, the device management service 306 may use the CA, which may have but not necessarily been used to generate and/or sign the session certificate, to generate the primary certificate for the IoT device 302. In some embodiments, the device management service 306 may utilize the CA configured to generate the primary certificate according to the identifying information for the IoT device 302 included in the request for the session certificate. For example, the CA may generate the primary certificate based on the UDID and/or MAC address of the IoT device.

In some embodiments, the primary certificate may indicate one or more functions that the IoT device 302 may perform. For example, the device management service 306 may generate the primary certificate to include a list of the one or more functions that the IoT device 302 may perform. In some embodiments, the one or more functions indicated in the primary certificate may correspond to a subset of functions that the IoT device 302 is capable of performing. For example, the IoT device 302 may be restricted from performing one or more other functions based on the primary certificate not indicating that the IoT device 302 has permission to perform the one or more other functions. Alternatively, the IoT device 302 may be restricted from performing one or more other functions based on the primary certificate specifically indicating that the IoT device 302 may not perform the one or more other functions.

The device management service 306 may be configured to encrypt the primary certificate to prevent malicious actors from intercepting the primary certificate and deploying the primary certificate to an unauthorized device, according to some embodiments. In some embodiments, the device management service 306 may utilize the CA to digitally sign and/or encrypt the primary certificate. For example, the CA may sign and/or encrypt the primary certificate after generation of the primary certificate.

The device management service 306 may send the primary certificate to the IoT device 302 via the secure connection established by the IoT device, according to some embodiments. For example, the device management service 306 may return the primary certificate via the secure connection over which the IoT device 302 sent the request for the primary certificate. In some embodiments, the device management service 306 may send the primary certificate to the client service 304 in order to allow the client service 304 to manage distribution of the primary certificate to the IoT device 302.

After receiving the primary certificate, the IoT device 302 may connect to the device management service 306 according to the primary certificate, according to some embodiments. For example, the IoT device 302 may send a connection request to the device management service 306 including the primary certificate. As another example, the connection request may include security information, such as keys, from the primary certificate. In some embodiments, the device management service 306 may validate the IoT device 302 based on validating the primary certificate. For example, the device management service 306 may validate the primary certificate to determine that the IoT device 302 is authorized to connect to the device management service 306. Validation of the primary certificate may include examining the primary certificate to determine that the primary certificate was properly generated and that the IoT device is the proper owner of the primary certificate. After validation of the IoT device 302, the IoT device 302 may perform one or more functions in accordance with permissions indicated by one or more of the device management service 306 or the primary certificate. For example, the device management service 306 may permit the IoT device 302 to perform a subset of possible functions that are performable by the IoT device 302. As another example, the IoT device 302 may be limited to perform a subset of possible functions based on the primary certificate indicating the subset of possible functions. In some embodiments, the connection to the device management service 306 may be to an endpoint that is different from another endpoint used to establish the access request, as described herein.

Figure 4:
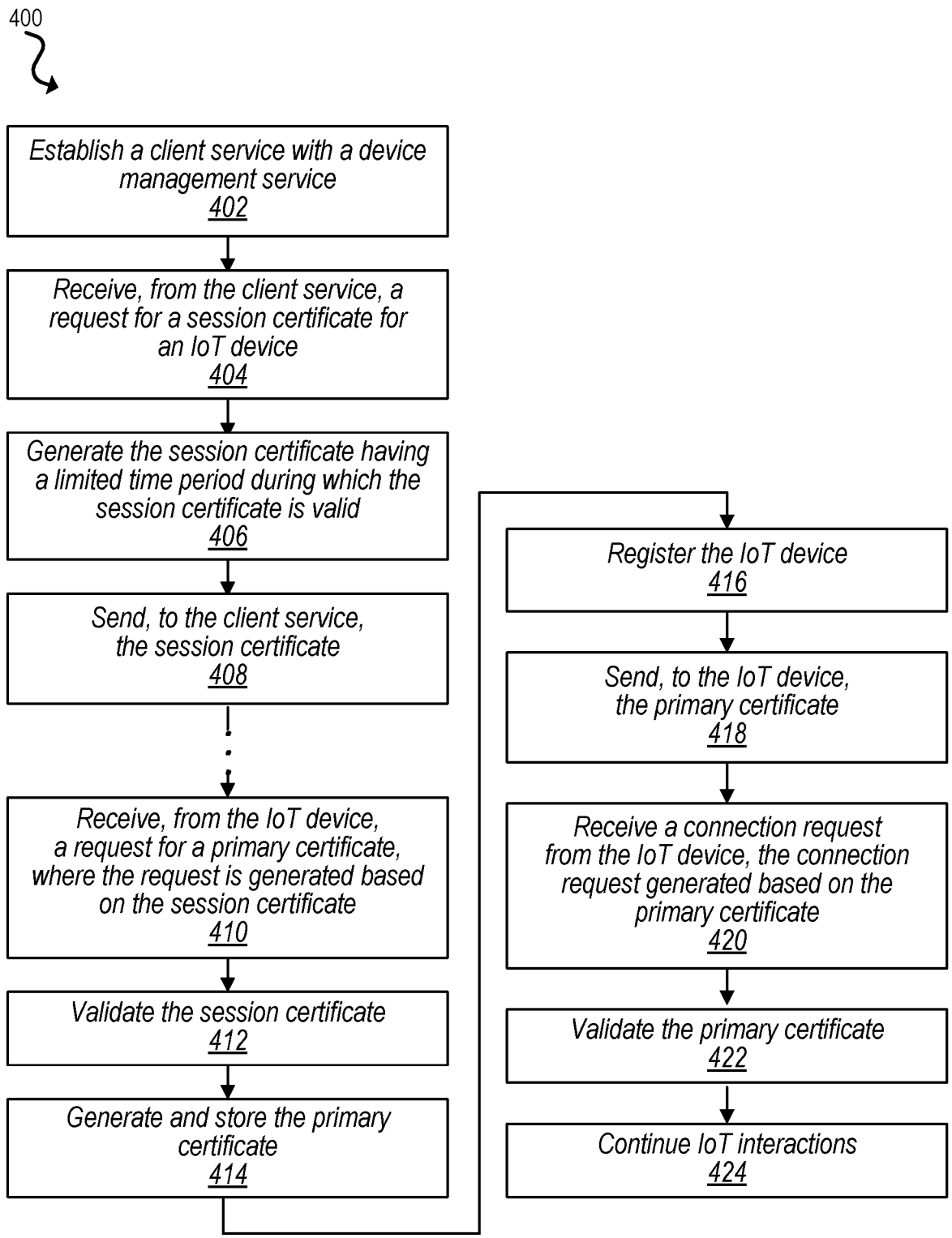
FIG. 4 is a flowchart diagram illustrating a method for a device management service generating certificates for an IoT device on behalf of a client service, according to some embodiments.

FIG. 4 is a flowchart diagram illustrating a method 400 for a device management service generating certificates for an IoT device on behalf of a client service, according to some embodiments. The method 400 may be performed by one or more computing devices configured to implement a device management service. The device management service may correspond to the device management service 110 of FIG. 1 or the device management service 306 of FIG. 3.

The method 400 begins by establishing a client service with a device management service, at 402. The client service may correspond to the client services 130 or 130a of FIG. 1 or the client service 304 of FIG. 3. In some embodiments, establishing the client service may include registering the client service as a client of the provider network. For example, the provider network may provide one or more services to the client service in addition to the device management service.

The method 400 includes receiving, from the client service, a request for a session certificate for an IoT device, at 404. The IoT device may correspond to the IoT device 130 of FIG. 1, the IoT device 202 of FIG. 2, or the IoT device 302 of FIG. 3. In some embodiments, the client service may send the request for the session certificate for the IoT device over a secure communication channel. For example, the request for the session certificate may be sent over a connection established with the TLS protocol. In some embodiments, the request for the session certificate may include identifying information about the IoT device or the client service.

The method 400 also includes generating the session certificate having a limited time period during which the session certificate is valid, at 406. In some embodiments, the session certificate may have a limited time period during which the IoT device may connect to the device management service. For example, the session certificate may have a session duration configured to allow a limited time session to facilitate the onboarding of the IoT device to one or more of the client service or the device management service. In some embodiments, the device management service may include a certificate manager configured to direct generation of the session certificate. In other embodiments, the device management service may direct a CA to generate the session certificate. The certificate manager and/or the CA may encrypt and/or sign the session certificate after generation, according to some embodiments.

The method 400 further includes sending, to the client service, the session certificate, at 408. In some embodiments, the device management service may be configured to send the session certificate over a secure communication channel. For example, the device management service may be configured to send the session certificate according to a TLS protocol connection. In some embodiments, the client service may forward the session certificate to the IoT device in order to allow the IoT device to communicate with the device management service directly.

The method 400 also includes receiving, from the IoT device, a request for a primary certificate, where the request is generated based on the session certificate, at 410. In some embodiments, the IoT device may send the request for the primary certificate over a secure communication channel. For example, the IoT device may send the request for the primary certificate over a TLS protocol connection. In some embodiments, the request may include the session certificate. In other embodiments, the request may include information from the session certificate. For example, the request may include security information, e.g., keys, from the session certificate.

The method 400 further includes validating the session certificate, at 412. In some embodiments, the device management service may validate the session certificate based on information contained in the session certificate included in the request for the primary certificate. For example, the device management service may verify that the session certificate includes information that has been stored at the device management service during the generation of the session certificate. In other embodiments, the device management service may verify that the request for the primary certificate has been sent prior to expiration of the session certificate. For example, the device management service may determine whether the request was sent during the session duration.

The method 400 also includes generating and storing the primary certificate, at 414. In some embodiments, the certificate manager may generate the primary certificate on behalf of the device management service. In other embodiments, the device management service may request that a CA generate the primary certificate on behalf of the device management service. In some embodiments, the primary certificate may have a primary duration that is longer than the session duration. For example, the primary duration may be at least an order of magnitude larger than the session duration. As another example, the primary certificate may be configured to allow long-term communications between the IoT device and the client service. In some embodiments, the primary certificate may be stored to a data store for the device management service. In other embodiments, information pertaining to the primary certificate may be stored to the data store.

The method 400 further includes registering the IoT device, at 416. In some embodiments, a device manager may store information pertaining to the IoT device to a data store. For example, the device manager may store identifying information for the IoT device. As another example, the device manager may store information linking the IoT device to the generated primary certificate to the data store.

The method 400 includes sending, to the IoT device, the primary certificate, at 418. In some embodiments, the device management service may send the primary certificate over a secure communication channel. For example, the device management service may send the primary certificate over a TLS protocol connection. The IoT device may utilize the primary certificate to establish a connection to the client service, according to some embodiments.

The method 400 includes receiving a connection request from the IoT device, the connection request generated based on the primary certificate, at 420. In some embodiments, the connection request may be received at the device management service at an endpoint that is different from a connection used during generation of the session certificate. For example, the connection request may be received at an endpoint that is configured to provide communications in accordance with a secure communication protocol.

The method 400 includes validating the primary certificate, at 422. In some embodiments, the device management service may validate the IoT device based on validating the primary certificate. For example, the device management service may validate the primary certificate to determine that the IoT device is authorized to connect to the device management service. Validation of the primary certificate may include examining the primary certificate to determine that the primary certificate was properly generated and that the IoT device is the proper owner of the primary certificate.

The method 400 concludes by continuing IoT interactions, at 424. The IoT device may continue performing various functions pursuant to applications installed or available on the IoT device in accordance with the device management service.

Figure 5:
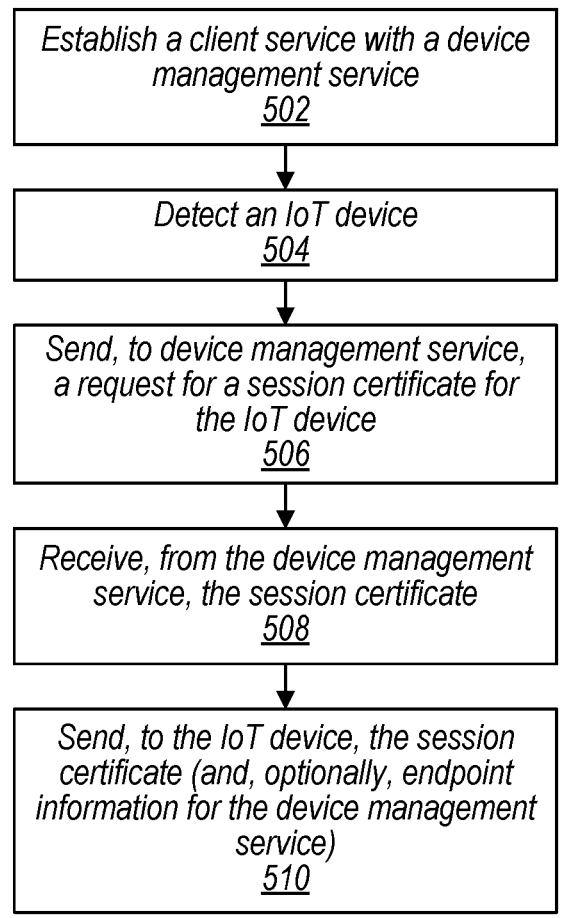
FIG. 5 is a flowchart diagram illustrating a method for a client service managing certificates for onboarding an IoT device, according to some embodiments.

FIG. 5 is a flowchart diagram illustrating a method 500 for a client service managing certificates for onboarding an IoT device, according to some embodiments. The client service may correspond to the client services 130 or 130a of FIG. 1 or the client service 302 of FIG. 3. The IoT device may correspond to the IoT device 130 of FIG. 1, the IoT device 202 of FIG. 2, or the IoT device 302 of FIG. 3.

The method 500 includes establishing a client service with a device management service, at 502. The device management service may correspond to the device management service 110 of FIG. 1 or the device management service 306 of FIG. 3. In some embodiments, establishing the client service may include registering the client service as a client of the provider network. For example, the provider network may provide one or more services to the client service in addition to the device management service.

The method 500 includes detecting an IoT device, at 504. In some embodiments, detecting the IoT device may include detecting a beacon signal broadcasted by the IoT device. For example, the IoT device may be configured to broadcast the beacon signal during an initial power-up sequence. In another embodiment, the client service may utilize a management device that may be used by a user of the IoT device. For example, the management device may include a mobile device that the user uses to interact with the IoT device and the client service. In some embodiments, the client service may poll local communication protocols in order to detect the IoT device. For example, the client service may search for the IoT device via a local area network or a Bluetooth connection.

The method 500 also includes sending, to device management service, a request for a session certificate for the IoT device, at 506. In some embodiments, the client service generate the request for the session certificate in response to detecting the IoT device. For example, the client service may determine that the detected IoT device requires the session certificate to initiate the onboarding process with the client service.

The method 500 further includes receiving, from the device management service, the session certificate, at 508. In some embodiments, the session certificate may have a session duration in which the session certificate is valid. For example, the session certificate may have a valid time period with a limited period of time that allows for the IoT device to initiate the onboarding process with the client service and the device management service.

The method 500 concludes by sending, to the IoT device, the session certificate and, optionally, endpoint information for the device management service, at 510. In some embodiments, the IoT device may not have information indicating endpoints that are usable to access the device management service. Thus, the client service may send the endpoint information in order to direct the IoT device to the device management service to facilitate the onboarding process. The client service may send the session certificate via a TLS protocol communication, according to some embodiments.

Figure 6:
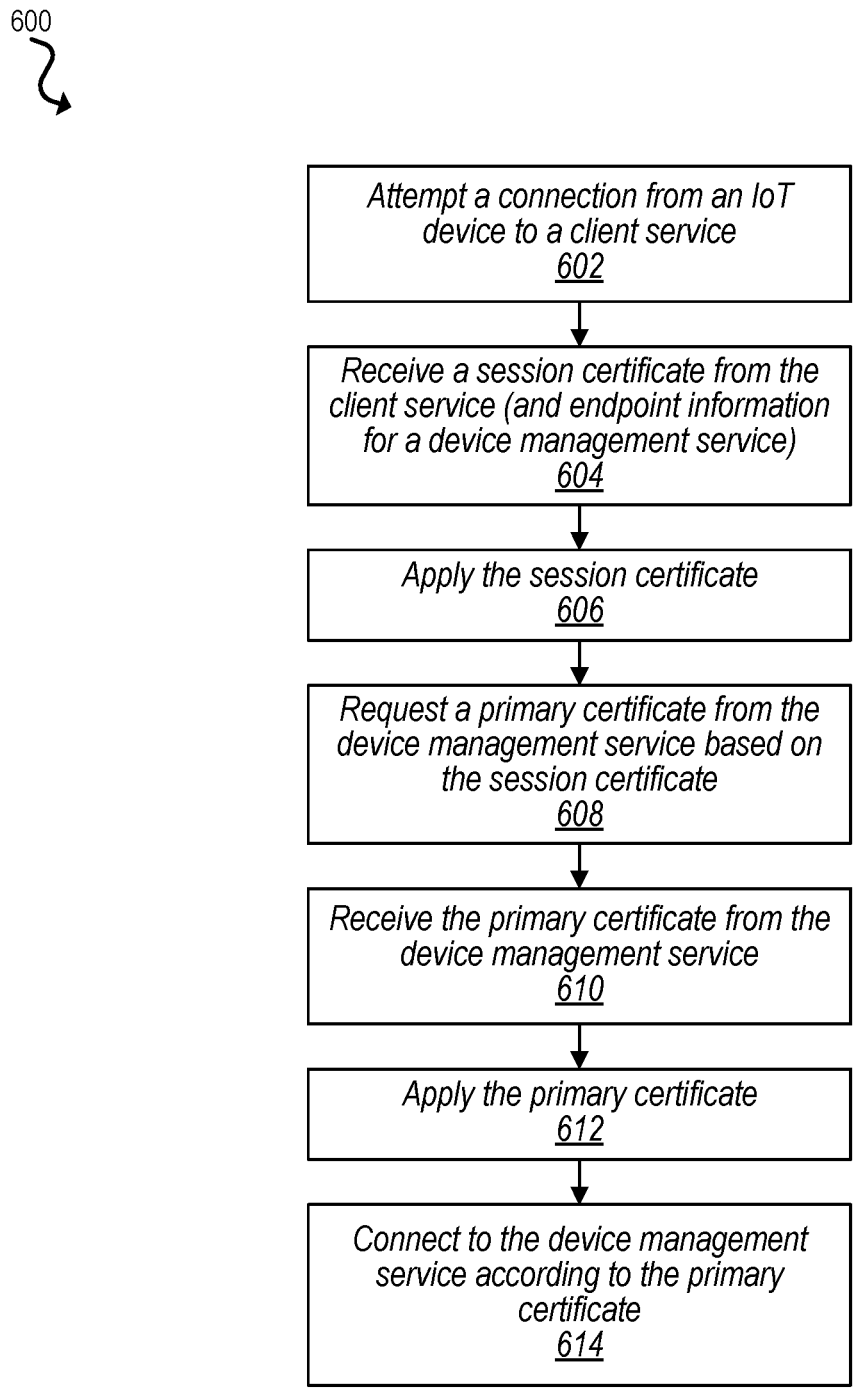
FIG. 6 is a flowchart diagram illustrating a method for an IoT device receiving certificates during an onboarding process with a client service, according to some embodiments.

FIG. 6 is a flowchart diagram illustrating a method 600 for an IoT device receiving certificates during an onboarding process with a client service, according to some embodiments. The method 600 may be performed by an IoT device. The IoT device may correspond to the IoT device 120 of FIG. 1, the IoT device 202 of FIG. 2, or the IoT device 302 of FIG. 3.

The method 600 begins by attempting a connection from the IoT device to a client service, at 602. The client service may correspond to the client services 130 or 130a of FIG. 1 or the client service 304 of FIG. 3. In some embodiments, the IoT device may be configured to broadcast a beacon signal to be detected by the client service. For example, the IoT device may be configured to broadcast the beacon signal during an initial power-up sequence. In another embodiment, the client service may utilize a management device that may be used by a user of the IoT device. For example, the management device may include a mobile device that the user uses to interact with the IoT device and the client service. In some embodiments, the client service may poll local communication protocols in order to detect the IoT device. For example, the client service may search for the IoT device via a local area network or a Bluetooth connection.

The method 600 includes receiving a session certificate from the client service and, optionally endpoint information for a device management service, at 604. The device management service may correspond to the device management service 110 of FIG. 1 or the device management service 306 of FIG. 3. In some embodiments, the session certificate may be generated by the device management service responsive to a request from the client service, as described herein. In some embodiments, the session certificate may have a session duration in which the session certificate is valid. For example, the session certificate may have a valid time period with a limited period of time that allows for the IoT device to initiate the onboarding process with the client service and the device management service.

The method 600 also includes applying the session certificate, at 606. In some embodiments, the IoT device may apply the session certificate based on modifying one or more configuration settings in accordance with the session certificate. In other embodiments, the IoT device may store the session certificate to a storage device of the IoT device to be retrieved at a later time during a connection attempt.

The method 600 further includes requesting a primary certificate from the device management service with the session certificate, at 608. In some embodiments, the IoT device may send a request for the primary certificate to the device management service over a secure communication protocol. In some embodiments, the request for the primary certificate may include the session certificate. In other embodiments, the request for the primary certificate may include keys or other security information obtained from the security certificate. For example, the IoT device may send the request for the primary certificate over a TLS protocol connection.

The method 600 also includes receiving the primary certificate from the device management service, at 610. In some embodiments, the device management service may send the primary certificate over the secure communication protocol in response to the request for the primary certificate. For example, the IoT device may receive the primary certificate over a TLS protocol connection.

The method 600 further includes applying the primary certificate, at 612. In some embodiments, the IoT device may apply the primary certificate based on modifying one or more configuration settings in accordance with the primary certificate. In other embodiments, the IoT device may store the primary certificate to a storage device of the IoT device to be retrieved at a later time during a connection attempt. In some embodiments, the primary certificate may have a primary duration in which the primary certificate is valid. For example, the primary certificate may have a valid time period with an extended period of time that allows for the IoT device to initiate the connections with the client service. As another example, the primary duration may be at least an order of magnitude longer than the session duration to allow for long-term connections between the IoT device and the client service.

The method 600 concludes by connecting to the device management service according to primary certificate, at 614. The IoT device may connect to an endpoint of the device management service that may be dedicated to IoT interactions with the device management service. The endpoint may be different than another endpoint used to establish an initial connection between the IoT device and the device management service. The IoT device may continue performing various functions pursuant to applications installed or available on the IoT device in accordance with the device management service.

Figure 7:
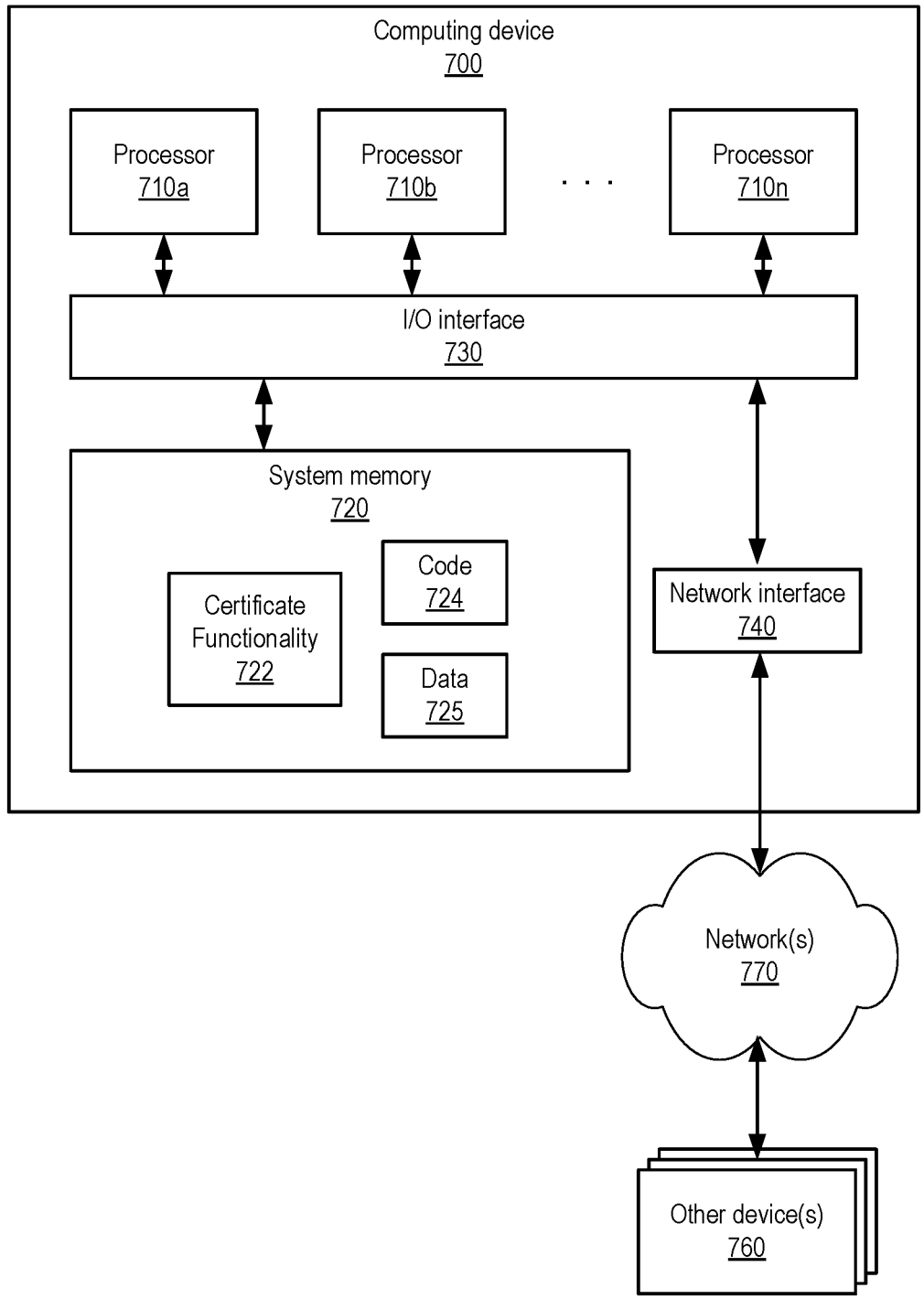
FIG. 7 is a block diagram illustrating an example computer system that may be used in some embodiments.

Any of various computer systems may be configured to implement techniques for managing memory compression in a secure manner, as disclosed herein. For example, FIG. 7 is a block diagram illustrating one embodiment of a computer system suitable for implementing some or all of the techniques and systems described herein. For example, each of the computer systems may host one or more respective containers. In some cases, a host computer system may host multiple containers. In various embodiments, the provider network may include one or more computer systems 700 such as that illustrated in FIG. 7 or one or more components of the computer system 700 that function in a same or similar way as described for the computer system 700.

In the illustrated embodiment, computer system 700 includes one or more processors 710 coupled to a system memory 720 via an input/output (I/O) interface 730. Computer system 700 further includes a network interface 740 coupled to I/O interface 730. In some embodiments, computer system 700 may be illustrative of servers implementing enterprise logic or downloadable application, while in other embodiments servers may include more, fewer, or different elements than computer system 700.

In various embodiments, computer system 700 may be a uniprocessor system including one processor 710, or a multiprocessor system including several processors 710 (e.g., two, four, eight, or another suitable number). Processors 710 may be any suitable processors capable of executing instructions. For example, in various embodiments, processors 710 may be embedded processors implementing any of a variety of instruction set architectures (ISAs), such as the x86, x86-64, ARM, PowerPC, SPARC, or MIPS ISAs, or any other suitable ISA. In multiprocessor systems, each of processors 710 may commonly, but not necessarily, implement the same ISA.

System memory 720 may be configured to store instructions and data accessible by processor 710. In various embodiments, system memory 720 may be implemented using one or more of any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for the management of securely memory compression are shown stored within system memory 720 as program instructions 724. In some embodiments, system memory 720 may include data 725 which may be configured as described herein. In some embodiments, system memory 720 may include certificate functionality 722. For example, the certificate functionality 722 may perform the functions of the certificate manager 112 of the device management service 110 of FIG. 1. As an alternative example, the certificate functionality 722 may manage the certificates 124 of the IoT device 120 of FIG. 1. As another example, the certificate functionality 722 may perform the functions of the certificate manager 134 of the client service 130 of FIG. 1.

In one embodiment, I/O interface 730 may be configured to coordinate I/O traffic between processor 710, system memory 720 and any peripheral devices in the system, including through network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments, some or all of the functionality of I/O interface 730, such as an interface to system memory 720, may be incorporated directly into processor 710.

Network interface 740 may be configured to allow data to be exchanged between computer system 700 and other devices attached to a network, such as between client devices (e.g., 760, etc.) and other computer systems, or among hosts, for example. In particular, network interface 740 may be configured to allow communication between computer system 700 and/or various other devices 760 (e.g., I/O devices). Other devices 760 may include scanning devices, display devices, input devices and/or other communication devices, as described herein. Network interface 740 may commonly support one or more wireless networking protocols (e.g., Wi-Fi/IEEE 802.11, or another wireless networking standard). However, in various embodiments, network interface 740 may support communication via any suitable wired or wireless general data networks 770, such as other types of Ethernet networks, for example. Additionally, network interface 740 may support communication via telecommunications/telephony networks such as analog voice networks or digital fiber communications networks, via storage area networks such as Fibre Channel SANs, or via any other suitable type of network and/or protocol.

In some embodiments, system memory 720 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 700 via I/O interface 730. A computer-readable storage medium may also include any volatile or non-volatile media such as RAM (e.g. SDRAM, DDR SDRAM, RDRAM, SRAM, etc.), ROM, etc., that may be included in some embodiments of computer system 700 as system memory 720 or another type of memory. Further, a computer-accessible medium may include transmission media or signals such as electrical, electromagnetic, or digital signals, conveyed via a communication medium such as a network and/or a wireless link, which may be implemented via network interface 740.

In some embodiments, I/O devices may be relatively simple or "thin" client devices. For example, I/O devices may be configured as dumb terminals with display, data entry and communications capabilities, but otherwise little computational functionality. However, in some embodiments, I/O devices may be computer systems configured similarly to computer system 700, including one or more processors 710 and various other devices (though in some embodiments, a computer system 700 implementing an I/O device 750 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 700. In general, an I/O device (e.g., cursor control device, keyboard, or display(s) may be any device that can communicate with elements of computing system 700.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on one or more computer-readable storage media coupled to the processor. The program instructions may be configured to implement the functionality described herein (e.g., the functionality of the data transfer tool, various services, databases, devices and/or other communication devices, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more computing devices configured to implement a device management service, the device management service configured to:
receive, from a client service, a request for a session certificate for a remote device;
send the session certificate to the client service, wherein the client service is configured to send the session certificate to the remote device, and wherein the session certificate is valid for the remote device to obtain a primary certificate during a session duration;
receive, from the remote device, a request for the primary certificate for the remote device, wherein the request for the primary certificate is generated based on the session certificate;
send, to the remote device, the primary certificate, wherein the primary certificate enables communication between the remote device and the device management service, and wherein the primary certificate has a primary duration that is longer than the session duration; and
establish a communication channel with the remote device in response to a connection request from the remote device generated based on the primary certificate.

2. The system of claim 1, wherein the device management service is further configured to:
perform one or more Internet of Things (IoT) interactions with the remote device via the communication channel.

3. The system of claim 1, wherein the device management service is further configured to:
in response to receiving the request for the primary certificate, validate security information from the session certificate included in the request; and
based on validation of the security information, generate the primary certificate.

4. The system of claim 1, further comprising:
one or more certificate authorities (CAs) configured to generate one or more of the session certificate and the primary certificate.

5. A method, comprising:
performing, with one or more computing devices implementing a device management service:
receiving, at the device management service from a client service, a request for a session certificate for a remote device;
sending, from the device management service, the session certificate to the client service, wherein the session certificate is valid for a session duration;
receiving, at the device management service from the remote device, a request for a primary certificate for the remote device, wherein the request for the primary certificate is generated based on the session certificate; and
sending, from the device management service to the remote device, the primary certificate, wherein the primary certificate enables communication between the remote device and the device management service, and wherein the primary certificate has a primary duration that is longer than the session duration.

6. The method of claim 5, further comprising:
establishing a communication channel with the remote device according to the primary certificate; and
performing one or more Internet of Things (IoT) interactions with the remote device via the communication channel.

7. The method of claim 6, wherein establishing the communication channel comprises:
validating the primary certificate, wherein the communication channel is established based on a validation of the primary certificate.

8. The method of claim 5, further comprising:
in response to receiving the request for the primary certificate, validating security information from the session certificate included in the request; and
based on validation of the security information, generating the primary certificate.

9. The method of claim 8, wherein validating the security information comprises:
determining whether the request for the primary certificate was sent during the session duration.

10. The method of claim 5, wherein the session certificate comprises information indicating the session duration and the remote device for which the session certificate is generated.

11. The method of claim 5, further comprising:
storing information pertaining to the session certificate to a data store, wherein the information indicates the limited time period and that the client service is a requesting entity for the session certificate.

12. The method of claim 5, further comprising:
storing registration information pertaining to the remote device to a data store, wherein the registration information indicates an identifier for the remote device and one or more permissions of the remote device.

13. The method of claim 5, further comprising:
sending a request to one or more certificate authorities (CAs) to generate the session certificate; and
sending another request to the one or more CAs to generate the primary certificate.

14. A device, comprising:
a network interface;
one or more processors; and
one or more memories storing instructions that, when executed on or across the one or more processors, cause the one or more processors to:
responsive to receiving a session certificate from a client service via the network interface, configure one or more device settings to enable communication with a device management service during a session duration according to the session certificate;
send, to the device management service via the network interface, a request for a primary certificate, wherein the request is generated based on the session certificate; and responsive to receiving the primary certificate from the device management service via the network interface, establish a communication channel with the device management service via the network interface according to the primary certificate.

15. The device of claim 14, wherein the one or more memories further comprise instructions that, when executed on or across the one or more processors, cause the one or more processors to:
configure the one or more device settings to enable communication with the device management service according to the primary certificate.

16. The device of claim 14, further comprising one or more applications configured to:
perform one or more Internet of Things (IoT) interactions with the device management service via the communication channel.

17. The device of claim 14, further comprising a data store, wherein the one or more memories further comprise instructions that, when executed on or across the one or more processors, cause the one or more processors to:
store the session certificate and the primary certificate to the data store.

18. The device of claim 14, wherein the one or more device settings comprise endpoint information indicating one or more endpoints for the device management service.

19. The device of claim 18, wherein the request for the primary certificate is sent to the device management service via the one or more endpoints.

20. The device of claim 14, wherein the primary certificate has a primary duration that is longer than the session duration.

* * * * *